United States Patent
Becker et al.

(10) Patent No.: US 7,462,337 B2
(45) Date of Patent: *Dec. 9, 2008

(54) RECOVERY OF TITANIUM DIOXIDE FROM TITANIUM OXIDE BEARING MATERIALS LIKE STEELMAKING SLAGS

(75) Inventors: Jan Hendrik Becker, Pretoria (ZA); Daniel Frederick Dutton, Witbank (ZA)

(73) Assignees: Highveld Steel and Vanadium Corporation Limited, Witbank (ZA); Rossmali Technology Holdings (Pty) Ltd, Pretoria (ZA)

( * ) Notice: Subject to any disclaimer, the term of this patent is extended or adjusted under 35 U.S.C. 154(b) by 133 days.

This patent is subject to a terminal disclaimer.

(21) Appl. No.: 10/450,294

(22) PCT Filed: Jun. 12, 2001

(86) PCT No.: PCT/IB01/01020

§ 371 (c)(1), (2), (4) Date: Nov. 20, 2003

(87) PCT Pub. No.: WO02/48412

PCT Pub. Date: Jun. 20, 2002

(65) Prior Publication Data

US 2004/0136899 A1 Jul. 15, 2004

(30) Foreign Application Priority Data

Dec. 12, 2000 (ZA) .................................. 2000/7400
Dec. 21, 2000 (ZA) .................................. 2000/7773

(51) Int. Cl.
C01G 23/047 (2006.01)

(52) U.S. Cl. .......................................... 423/82; 423/610
(58) Field of Classification Search .................. None
See application file for complete search history.

(56) References Cited

U.S. PATENT DOCUMENTS

| | | | |
|---|---|---|---|
| 1,889,027 A * | 11/1932 | Washburn | 423/82 |
| 2,389,026 A * | 11/1945 | Cauwenberg et al. | 423/610 |
| 2,531,926 A | 11/1950 | Myers et al. | |
| 2,589,910 A | 3/1952 | Schneider | |
| 3,218,131 A | 11/1965 | Grose | |
| 3,341,291 A | 9/1967 | Barnard et al. | |
| 3,929,501 A * | 12/1975 | Dunn, Jr. | 106/439 |
| 4,098,869 A * | 7/1978 | Paolinelli et al. | 423/85 |
| 4,117,076 A * | 9/1978 | Gueguin | 423/78 |
| 4,731,230 A | 3/1988 | Lailach et al. | |

(Continued)

FOREIGN PATENT DOCUMENTS

| | | |
|---|---|---|
| CN | 86108511 | 6/1988 |
| DE | 11 99 746 | 9/1965 |
| GB | 629333 | 9/1949 |

*Primary Examiner*—Steven Bos
*Assistant Examiner*—Paul Wartalowicz
(74) *Attorney, Agent, or Firm*—Pauley Petersen & Erickson

(57) ABSTRACT

A method of recovering titanium dioxide from a titanium oxide bearing raw material, such as e.g. steel slags rich in $TiO_2$ includes the steps of grinding the titanium dioxide raw material, reacting the particulate raw feed material with sulphuric acid under specified conditions, digesting and filtering the resultant cake material containing titanyl sulphate, hydrolysing the titanyl sulphate and, after washing the hydrolysate, calcining the hydrolysate to produce titanium dioxide.

23 Claims, 1 Drawing Sheet

U.S. PATENT DOCUMENTS

| | | | |
|---|---|---|---|
| 4,759,800 A * | 7/1988 | Luginsland et al. | 106/437 |
| 5,123,956 A * | 6/1992 | Fernandez et al. | 75/423 |
| 5,277,816 A * | 1/1994 | Watanabe | 210/634 |
| 5,527,469 A | 6/1996 | Lawhorne et al. | |
| 5,550,096 A * | 8/1996 | Inoue et al. | 502/217 |
| 5,618,331 A * | 4/1997 | Miller et al. | 75/743 |

* cited by examiner

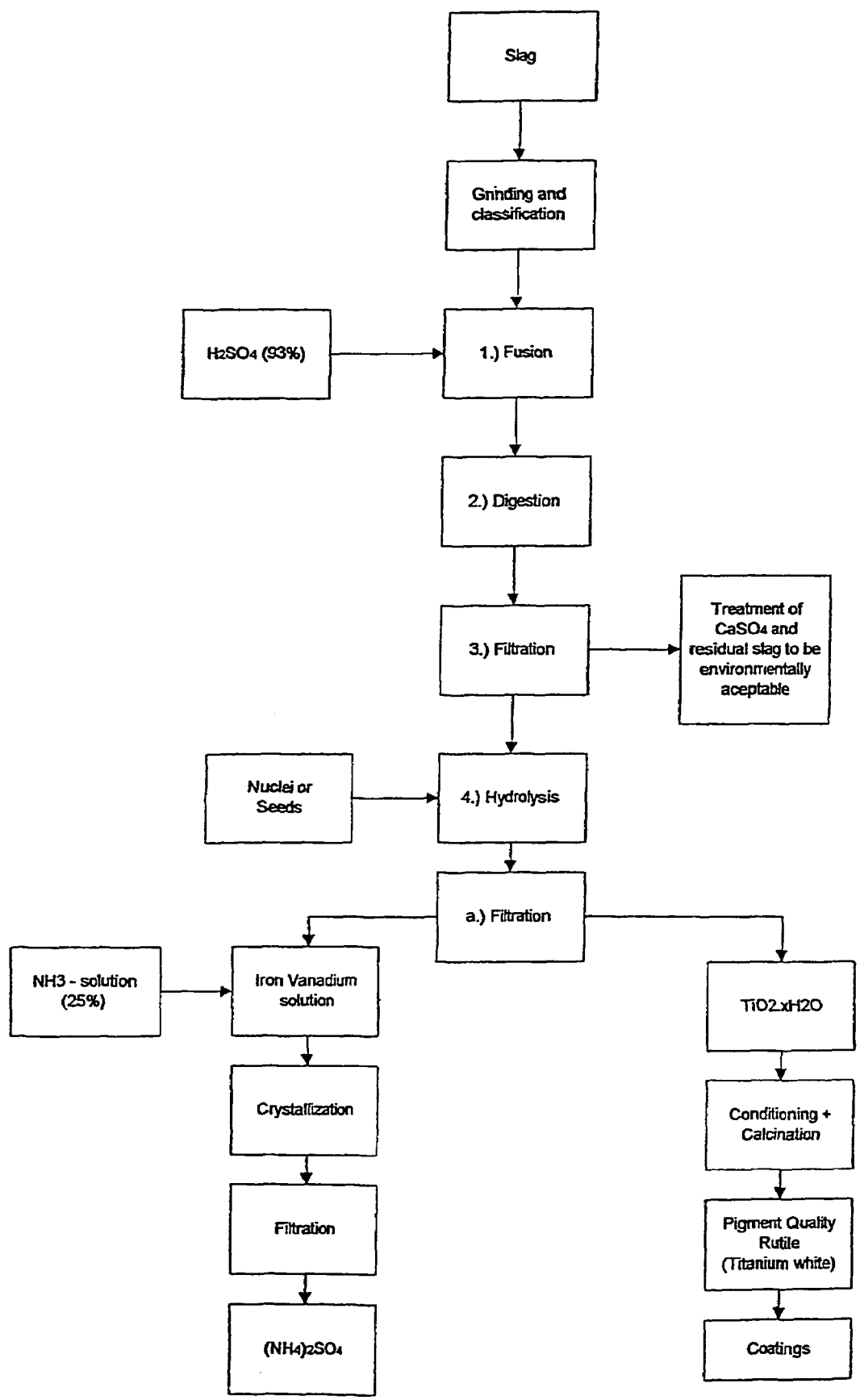

RECOVERY OF TITANIUM DIOXIDE FROM TITANIUM OXIDE BEARING MATERIALS LIKE STEELMAKING SLAGS

BACKGROUND OF THE INVENTION

This invention relates to the recovery of titanium from titanium bearing materials, and in particular to a method of recovering titanium dioxide or titanium metal from a titanium dioxide bearing material.

Highveld Steel and Vanadium Corporation is a large manufacturer of steel using its own unique steel manufacturing process. The slag produced in this steel manufacturing process is rich in titanium dioxide, typically in amounts of 22 to 32% of the slag material.

Pure titanium dioxide is white in colour and is, therefore, a valuable pigment used in many applications such as the production of paints, paper, cement, polymers and the like. The slag produced in the Highveld Steel manufacturing process is an ideal source of titanium dioxide for this purpose. However, there is currently no viable commercial process for recovering the titanium dioxide from the slag material.

SUMMARY OF THE INVENTION

A method of recovering titanium dioxide from a raw material containing the titanium dioxide comprises the steps of:
  a) grinding the titanium dioxide bearing material to form a particulate raw feed material;
  b) contacting the particulate raw feed material with a predetermined amount of sulphuric acid in a reaction vessel and raising the temperature in the reaction vessel to a predetermined temperature at which a reaction takes place to produce a cake material containing titanyl sulphate;
  c) contacting the cake material with a sufficient quantity of water, and optionally recovered process acid, to dissolve the cake material, which contains the titanyl sulphate;
  d) filtering the resultant suspension and collecting the solution containing the titanyl sulphate;
  e) hydrolysing the titanyl sulphate containing solution by contacting the solution with water, which has first been seeded with an appropriate amount of rutile and heated, or a portion of previously hydrolysed solution containing hydrated titanium dioxide, and heating the solution to boiling point to precipitate out hydrated titanium dioxide;
  f) washing the hydrolysate with an ammonium solution to remove residual sulphate as ammonium sulphates followed by filtering off the hydrated titanium dioxide; or
  g) filtering the hydrolysate followed by washing with sodium hydroxide, ammonium hydroxide, water, phosphoric acid and/or diluted sulphuric acid; and
  h) calcining the hydrolysate to drive off any residual acid and water of crystallisation to produce titanium dioxide.

The slag in step a) is preferably ground to form a particulate material in which at least 80% of the particles are able to pass through a 175 micron mesh, more preferably a 45 micron mesh.

The reaction of the sulphuric acid solution and particulate feed material in step b) typically takes place in a fusion reactor, which may be a batch or continuous fusion reactor.

The temperature is preferably raised in the fusion reactor by introducing pre-heated air into the reaction vessel.

Cold air is preferably blown through the cake material, in particular for a period of about 4 hours, after the reaction is completed to produce a porous cake.

The porous cake is preferably left to mature for an appropriate time, typically about 8 hours.

In step c), air is preferably introduced with the water, and optionally recovered process acid, in order to assist with agitation to dissolve the cake.

The air is preferably cold air to control the reaction temperature, preferably below about 85° C., more preferably below about 75° C., in order to prevent premature crystallisation of $TiO_2$.

After the desired amount of water has been introduced, air and mechanical agitation is used to break the cake into a homogenous suspension.

The hydrolysis step e) is preferably carried out in the absence of a prior crystallisation and vacuum concentration step having taken place.

The slag material typically also contains $V_2O_5$, FeO and calcium. The calcium is typically removed as calcium sulphate, typically during the filtration step d). The vanadium and iron are typically removed as $VOSO_4$ and $FeSO_4$ or $FeOSO_4$ in the solution remaining in step e).

If necessary, the titanium dioxide produced in step h) may be further-purified. The additional purification method preferably comprises the steps of:
  i) bricketing or pelletising the titanium dioxide and subjecting it to a chlorination step, in particular gas chlorination, in order to produce gaseous $TiCl_4$;
  j) condensing the gaseous $TiCl_4$ to produce a crude liquid $TiCl_4$;
  k) distilling the crude liquid $TiCl_4$ to produce a substantially pure $TiCl_4$ liquid; and either
  l) gasifying the pure $TiCl_4$ liquid to produce gaseous $TiCl_4$ and oxidising the gaseous $TiCl_4$ to produce titanium dioxide pigment, or
  m) treating the pure $TiCl_4$ liquid in a conventional process, such as a Krohl process, to produce metallic titanium.

BRIEF DESCRIPTION OF THE DRAWING

The invention will now be described in more detail, by way of example only, with reference to the accompanying drawing which is a schematic flow diagram of a preferred embodiment of a method of recovering titanium dioxide according to the present invention.

DETAILED DESCRIPTION OF PREFERRED EMBODIMENTS

The present invention is directed at a so-called sulphating process for recovering titanium, in particular titanium dioxide, from a titanium bearing material, in particular a slag produced in a steel manufacturing process containing titanium dioxide.

In the first embodiment of the invention, the titanium bearing material is ground to an appropriate particle size and classified. For ease of describing the process, reference is made to a slag produced in a steel manufacturing process, the slag containing about 22 to 32% titanium dioxide. The raw material is ground into a particulate material until at least 80% of the titanium dioxide in the slag is liberated and is able to pass through a 175 micron mesh, more preferably a 45 micron mesh.

The particulate material is then reacted with sulphuric acid in a continuous or batch fusion reactor. In order to carry out the reaction, the desired amount of sulphuric acid, typically a 93% to 96% sulphuric acid solution at suitable temperature, is firstly introduced into the fusion reactor. The particulate feed material is then added to the sulphuric acid solution. Preheated air, or steam if appropriate, is then introduced through the bottom of the reactor and allowed to rise through the reaction mix in order to heat the reaction mix to the point where the reaction commences. The heated air is normally introduced at about 400° C. and the reaction usually commences at around 100° C.

The exothermic reaction of the sulphuric acid with the fine feed material is a violent reaction, which is evident from the white fumes of $SO_2/SO_3$ coming off the reaction mixture. After the reaction has proceeded substantially to completion, a dense cake containing titanyl sulphate is formed. The air velocity is increased and allowed to pass through the cake material in order to "mature it" i.e. to produce a porous cake material.

Once the porous cake material has been produced, water is introduced from the bottom of the reactor and allowed to flow through the cake to begin digestion thereof. During this leaching step, it is important to introduce cool air into the reactor to keep the temperature below about 85° C., preferably below 75° C., depending on the feed stock (e.g. if it has a high chromium content) to avoid premature precipitation of titanium dioxide. The leaching process is continued until the cake material has been completely digested, resulting in a liquid to solid ratio of about 1:1, with a high concentration of $TiOSO_4$, $VOSO_4$, and $FeOSO_4$ or $FeSO_4$. Typically, the cool air is allowed to pass through the cake and act as a mixing agent or agitator until the cake has been completely digested and a suspension is produced. This stage of the process typically takes about 4 hours until completion.

Once the cake material has been digested, the reactor is drained and the suspension subjected to a filtration step in an appropriate filter system (such as a settling drum and press) to remove calcium sulphate and other slag residue. The calcium sulphate and slag residue can be further treated in a conventional way to recover $H_2SO_4$ to make the tailings more environmentally friendly.

The solution containing $TiOSO_4$, $VOSO_4$, $FeOSO_4$ and $FeSO_4$ and minute amounts of calcium is a very dense solution (having the appearance of an oil) due to the high concentration thereof.

The dense solution is processed in a hydrolysis step in order to precipitate out the $TiO_2.xH_2O$. During this hydrolysis step, about 1% nuclei rutile is added to water at 25° C., whereafter the water is heated to a temperature of about 60° C. The titanyl sulphate solution is then added to the seeded water and the temperature raised to boiling point (+/−95° C.), at which stage hydrolysis takes place. Hydrolysis is clearly evident from the white suspension which is produced. This step is allowed to proceed for +/−1 hour in order for hydrolysis to be completed. The hydrolysate is then filtered in a hot filtration step in order to recover the hydrated titanium dioxide. The filtration is carried out in a hot filtration step in order to keep the particle size large enough to be captured by the filtering medium.

The liquor is a misty blue colour due to the Fe and V components which can be recovered from the liquor. Once the Fe and V have been recovered, the liquor may be reused for washing or leaching.

The hydrolysate recovered in the filtration process contains $TiOxH_2O.SO_3$. This product is washed with an ammonium solution, typically a 12.5% $NH_3$ solution, to remove any residual Fe and V and also to remove sulphate as ammonium sulphate.

The resultant $TiO_2.xH_2O$ hydrolysate, containing about 91% $TiO_2$, and some $SO_4^{2-}$, $VOSO_4$, $FeOSO_4$ and $FeSO_4$, is then calcined in an oxidative environment by passing air through the product at a temperature of about 950° C. for about an hour. The $SO_3$ is driven off and can be recovered as $H_2SO_4$ together with the waters of crystallisation. The resultant titanium dioxide product has a purity of about 98%.

If desired, the leachate containing the $VOSO_4$ and $FeOSO_4/FeSO_4$ is crystallised, and filtered to recover $(NH_4)_2SO_4$ fertiliser. The solution containing the Fe and V components can then be treated in a conventional manner to recover the iron and vanadium.

As mentioned previously, pure titanium dioxide is a very valuable product as a white pigment. However, a 98% titanium dioxide product is not suitable for this purpose. Accordingly, the titanium dioxide recovered is further purified by a purification process in order to produce a product greater than 99.99% titanium dioxide.

The first step in this additional purification process is a gas chlorination step. In this step, the titanium dioxide is bricketed or pelletised and then introduced into a shaft furnace or salt bath to which is added a small amount of activated carbon. Chlorine gas is then passed through the bottom of the bed at ambient temperature. The temperature in the bed typically reaches about 900° C. whereupon gaseous $TiCl_4$ is driven off.

The gaseous $TiCl_4$ is then condensed in a conventional condenser and the crude liquid $TiCl_4$ containing $FeCl_3$ and $VOCl_3$ is recovered.

The crude $TiCl_4$ liquid is distilled in a distillation column with a sodium chloride crystals reactor to remove the $FeCl_3$ and some of the $VOCl_3$. The remainder of the $VOCl_3$ can be removed by a fractional distillation process with aluminium as a reagent in a conventional manner. The $VOCl_3$ recovered in the fractional distillation process can then be further treated to recover vanadium.

The purified $TiCl_4$ liquid is then oxidised in an oxidation process in order to produce titanium dioxide pigment having greater than 99.99% purity. Alternatively, the pure $TiCl_4$ liquid can be treated in a conventional Krohl process to produce titanium metal.

The above embodiment of the invention will now be described in more detail with reference to the following non-limiting example.

EXAMPLE

The slag used in this example comprised the following components:

| | |
|---|---|
| CaO | 14% |
| MgO | 13% |
| $SiO_2$ | 25% |
| $Al_2O_3$ | 15% |
| S | 0.3% |
| $TiO_2$ | 25% |
| $V_2O_5$ | 0.7% |
| FeO | 6.5% |

The raw slag material was ground and classified until 80% of the fine particulate material had an average diameter of less then 175 microns, as determined by passing the particulate material through a 175 micron mesh.

15 Liters of 93% $H_2SO_4$ was introduced at 25° C. into a sealed reactor. 20 kg of fine slag material was then introduced into the reactor and after about 2 minutes the temperature rose from about 25° C. to about 63° C., which is indicative of the exothermic reaction already taking place. Air, which had been pre-heated to 400° C., was then introduced into the bottom of the reactor. The appropriate valve was opened to about 25% of its capacity. Within 5 minutes, the temperature of the reaction mixture had reached 100° C. whereupon the exothermic reaction started to take place, as was evident from the violent white fumes of $SO_3$ coming off the reaction mixture. After a further 3 minutes the temperature had risen to about 173° C. and continued to rise to a maximum of about 210° C., whereafter the temperature started to drop. After a further 10 minutes, the temperature had dropped to about 100° C. at which time cake formation commenced. The air valve was then opened to its full capacity and the temperature once again rose to about 130° C. whereafter it dropped off. The air was allowed to continue flowing through the cake mass for a period of 6 hours to form a porous cake.

The porous cake was then leached by passing water from the bottom of the reactor together with compressed air to keep the temperature below about 90° C. It is important to keep the temperature below 90° C., preferably below 85° C., more preferably below 75° C., in order to prevent premature hydrolysis of the titanium dioxide. The liquid to solid ratio was found to be 1:1 with a high concentration of $TiOSO_4$, $VOSO_4$, $FeSO_4$ and $FeSO_4$. The air was allowed to continue bubbling through the mixture for 4 hours, acting as a mixing agent and agitator, until the entire cake had been digested to produce a liquid suspension. The reactor was then drained.

The suspension was filtered to remove calcium sulphate and slag residue. The leachate or solution containing the titanyl sulphate, $VOSO_4$, $FeOSO_4$ and $FeSO_4$ and ppm amounts of calcium, which was a very dense solution (almost oil like) due to its high concentration, was then hydrolysed to obtain the titanium dioxide. In order for hydrolysis to take place, an appropriate amount of water was seeded with about 1% nuclei rutile and then heated to 60° C. The titanyl sulphate solution was then added to the preheated seeded water solution and the temperature raised to boiling point (+/−95° C.) whereafter hydrolysis took place, producing a white suspension. The process was continued for an hour in order for hydrolysis to be completed, whereafter the hot suspension was filtered to recover the hydrated titanium dioxide. This hydrolysate was then washed with a 12.5% $NH_3$ solution to remove any residual Fe and V and also residual sulphate as ammonium sulphate. The filtered hydrolysate was removed and calcined in an oxidative environment at 950° C. for 1 hour in order to drive off $SO_3$ and waters of crystallisation.

The resultant product was a white titanium dioxide which was analysed and found to be +/−98% pure.

Although the 98% titanium dioxide was not further purified, it is believed that the additional purification process described above can be used to produce greater than 99.99% titanium dioxide from the 98% titanium dioxide material.

Although the additional purification step results in a greater than 99.99% titanium dioxide product, chlorine gas is an extremely dangerous product and has to be used under strictly controlled conditions. The applicant therefore set about adapting the process to produce 99.9% titanium dioxide without the need for an additional gas chlorination stage. It was surprisingly found that by optimising the process steps in a number of areas, a titanium dioxide product having a purity of greater than 99.9% can be obtained.

Accordingly a second, particularly preferred embodiment will now be described with reference to the accompanying drawing.

The titanium slag available is dried as needed and ground to a uniform fine particle size. The pulverized slag is mixed with approximately 1.3 parts by weight of 93% sulphuric acid and heated with pre-heated air in a reactor vessel. At about 100° C. the exothermic reaction starts and the slag is converted into a solid mass composed of soluble titanium, vanadium and iron sulphates. The use of heated air instead of heated steam has been found to be preferable. The reason for this is that the Highveld Steel slag used in the process has free iron present, in an amount of about 4%, in the ferrous state. Accordingly, it is undesirable to have water in the fusion reaction as it would transform the free iron to the $Fe^{+++}$ state. In addition, the presence of oxygen in the heated air assists in the recovery of the titanium by converting $Ti^{+++}$ to $Ti^{++++}$.

Cold air is then blown through the cake for about 4 hours after the reaction is completed to produce a porous cake. The cake so produced is left to mature for about 8 hours.

The reaction cake is then digested in water, and optionally recovered process acid, in a ratio of water to solid of about 1.5:1 in order to dissolve the desired titanium compounds. During the introduction of water, air is introduced simultaneously to assist with agitation, as mechanical agitation would not at this stage be effective due to the solid cake formed. During the introduction of air and water an exothermic reaction takes place. As it is important for the reaction temperature to be controlled below 75° C., in order to avoid premature crystallisation of the $TiO_2$, proper flow control of the cold air into the reactor vessel is maintained. After the desired amount of water has been introduced, air and mechanical agitation is used to break the cake into a homogeneous suspension. The appropriate time to achieve the suspension is in the order of 4 hours, but visible inspection will indicate when this has been achieved.

Some of the titanium compounds which are believed to go into solution when digesting the cake with water include:

$TiO_2 \cdot xH_2O$ $TiOSO_4 \cdot H_2O$ $TiOSO_4 \cdot 2H_2O$ $TiSO_4 \cdot H_2SO_4 \cdot 2H_2O$ $TiSO_4 \cdot H_2SO_4 \cdot H_2O$ $Ti(SO_4)_2$.

Where ilmenite is used as a raw material, the solution typically contains trivalent or "ferric" iron. This is reduced to the divalent or "ferrous" form with scrap iron as reducing agent. This step is not required in the case of the Highveld Steel slag as the iron in the slag is already in the "ferrous" state.

The suspension so obtained is filtered through a filter system, typically using large settling tanks. The filtrate consists mainly of calcium sulphate $CaSO_4$ and residue. The $CaSO_4$ residue can be treated to recover $H_2SO_4$. A very dense yellow solution is obtained after filtering, which is rich in peroxide $TiO_3 \cdot 2H_2O$. By way of information, the peroxide is an oxidising substance which is unstable in the presence of water and is much more soluble than $TiO_2$ or $TiO_2 \cdot H_2O$. It dissolves in acid solutions with the formation of yellow to red pertitanyl ions ($TiO_2^{++}$). In alkaline solutions, it forms titanate ions ($HTiO_3^-$) and/or colourless pertitanate ions ($HTiO_4^-$ and $TiO_4^-$). The solubility of the peroxide is around 1 g. mol/l at a pH of 0.5 (acid medium) and at a pH of 12 (alkaline medium). By the action of hydrogen peroxide on very acid solutions of tri- or tetravalent titanium, a solution of peroxidized $TiO_2^{++}$ ions is obtained, which deposits as a precipitate of peroxide, $TiO_3 \cdot 2H_2O$, upon increasing the pH.

During the hydrolysis step, the titanium solution is transformed into a white titanium oxyhydrate slurry. The steps that have gone before are fundamental in preparing the titanium compounds for hydrolysis. One step which is not required when using Highveld slag is crystallization and vacuum concentration. Thus, hydrolysis is carried out by contacting the titanyl sulphate containing solution with heated water which has been seeded with nucleating or seeding agents, in particular nuclei rutile, and then boiled.

The formation of titanyl hydroxide proceeds according to the following reactions:

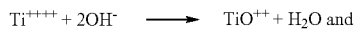

$$Ti^{++++} + 2OH^- \longrightarrow TiO^{++} + H_2O \text{ and}$$

$$TiO^{++} + 2OH^- \longrightarrow TiO(OH)_2$$

To increase the rate of thermal hydrolysis of sulphate solutions at atmospheric pressure and at the same time obtain products of pigment grade, nucleating or seeding agents are added. Normally only 1% nuclei or seed agent is required. The composition, purity, and physical properties of hydrolytically precipitated titanium dioxide depend to a large extent upon the conditions under which the decomposition takes place, such as composition of the solution employed, temperature, and duration of boiling. In the commonly employed processes, large changes in the concentration of the solution would take place as the hydrolysate is formed and an equivalent amount of acid is liberated. Thus the formation of titanic acid will take place under entirely different conditions at the beginning and at the end of the operation.

To overcome this effect, a titanium-rich solution is prepared from the slag, transferred into a precipitation vessel and heated until practically complete hydrolysis has taken place. Four fifths of the liquor is then removed. To the remaining one fifth, still at the precipitation temperature, fresh pregnant solution is added at such a rate as to secure a practically constant concentration of dissolved titanium until the vessel is filled. Heating is continued throughout the process. The supply of solution is then interrupted, and four fifths of the liquor is again removed. The operation is repeated as often as is necessary. The above process only requires initial introduction of nuclei or seeding agents, thereafter the one fifth liquor contains enough nuclei seeding agents to initiate the hydrolysis reaction. The total cycle time of the exercise is between 3 and 6 hours.

The $TiO_2.xH_2O$ is removed by means of filtering through a filtering system. The hydrolysate is then washed with either sodium hydroxide, ammonium hydroxide, water, phosphoric acid or dilute sulphuric acid to improve the properties of the titanium white. Contaminants that would impart undesirable colour to the finished product are removed from the hydrolysate by extensive washing on special filters.

The iron/vanadium solution can be heated with a 25% $NH_3$ solution, crystallised and filtered to recover the iron and vanadium and $(NH_4)_2SO_4$.

The main reason for washing the hydrolysate is to neutralize the liquor and to improve the crystal properties. Conditioning agents such as dilute acids and zinc or aluminium powder or a powerful non-metallic reducing agent or phosphoric acid or an alkaline metal could also be introduced during this washing stage, to ensure the formation of the rutile structure during the calcination process that follows.

The thoroughly purified and washed hydrolysate obtained by the thermal hydrolysis of titanium salt solutions is an amorphous hydrous oxide which still contains impurities as chemi-adsorbed acid. In addition, it is too fine-grained and almost amorphous, which is undesirable for pigment grade $TiO_2$. In the production of pigment grade $TiO_2$, accordingly, a calcination step is necessary to drive off the water and residual acid and at the same time convert the titanium dioxide to the crystalline form of a required particle size. At the same time, desired pigmentary properties are developed.

Amorphous titanic oxide or hydroxide ($TiO.xH_2O.SO_3$), (such as is obtained from the sulphate solution, is converted to the crypto crystalline modification of pigment grade $TiO_2$ by calcination at 950° C. for 1 hour.

Grinding, classifying and pulverizing of the calcined product produces the $TiO_2$ pigment material having a purity of greater than 99.9%.

The various solutions produced in a test process of the invention were analysed by Anglo American Research Laboratories (Pty) Ltd for the presence of Si, Ca, Ti, V and Fe, and the results thereof are set out in table 1 below.

TABLE 1

Analysis of Solutions by ICP-OES

| | Si mg/L | Ca mg/L | Ti mg/L | V mg/L | Fe mg/L |
|---|---|---|---|---|---|
| 1 | 11 | 209 | 60498 | 2025 | 20952 |
| 2 | 4.4 | 98 | 8632 | 475 | 4943 |
| 3 | | 51 | 178 | 18 | 186 |
| 4 | 14 | 354 | 12887 | 777 | 11914 |
| 5 | | 80 | 1045 | 74 | 1151 |
| 8 | | 151 | 4922 | 267 | 4077 |

Key to the above table:
1. Solution obtained during the 1:1 water digestion of the fused cake in step 2.
2. The filtrate solution obtained after the hydrolysis in step 4.
3. The filtrate wash solution obtained in the hydrolysis step 4 when the $TiO_2.xH_2O$ is removed by filtering and then washed.
4. The filtered solution after hydrolysis (batch 1).
5. The filtrate wash solution (batch 1).
8. The filtrate solution after hydrolysis (batch 2).

Various batches of $TiO_2$ obtained in the abovementioned process were analysed to determine the optimum calcination parameters. The results of this analysis is set out in table 2 which follows.

TABLE 2

Analysis of $TiO_2$

| | $TiO_2$ % | Fe μg/g | S μg/g | V μg/g |
|---|---|---|---|---|
| 6 | 99.9 | 413 | 1969 | 176 |
| 7 | 97.4 | 234 | 18817 | 26 |
| 9 | 99.9 | 525 | 446 | 198 |
| 10 | 81.3 | 546 | 65126 | 205 |

Key to table 2:
6 $TiO_2$ calcined for 1 hour.
7 $TiO_2$ calcined for ½ hour.
9 $TiO_2$ calcined for 2 hours.
10 $TiO_2$ undergoing no calcination.

From the above table, it is evident that at least 1 hour is required for obtaining 99.9% $TiO_2$. However, in order to reduce the amount of S (in the form of $SO_3$), 2 hours in the calcining operation was found to be optimum.

From the above results, it is evident that it is possible to obtain pigment grade the titanium dioxide having a purity of 99.9% or greater without having to carry out an additional purification method.

As the process is able to produce titanium dioxide which is extremely pure, it provides an ideal means of recovering titanium dioxide from slag or other titanium dioxide bearing materials to produce white pigment or titanium metal, valuable products in industry.

The invention claimed is:

1. A method of recovering titanium dioxide from a titanium dioxide bearing material, comprising the steps of:
   a) grinding a material containing 22-32% by weight titanium dioxide to form a particulate raw feed material;
   b) contacting the particulate raw feed material with an up to 96% sulphuric acid solution in a fusion reactor and introducing a non-aqueous reaction initiator including a gas consisting of pre-heated air into the fusion reactor to heat the fusion reactor to a reaction temperature at which a reaction takes place to produce a cake material containing titanyl sulphate;
   c) dissolving the cake material by contacting the cake material with a sufficient quantity of water, and optionally sulphuric acid, and by introducing air with the water, in order to facilitate agitation to dissolve the cake, forming a solution which contains the titanyl sulphate;
   d) filtering and collecting the solution containing the titanyl sulphate;
   e) hydrolysing the solution by contacting the solution with at least one of 1) water, which has first been seeded with an appropriate amount of rutile and heated, or 2) a portion of previously hydrolysed solution containing hydrated titanium dioxide; and heating the solution to a boiling point to precipitate out hydrated titanium dioxide;
   one of f) washing the hydrated titanium dioxide with an ammonium sulphate solution to remove residual sulphate as ammonium sulphates followed by filtering off the hydrated titanium dioxide or g) filtering the hydrated titanium dioxide followed by washing with sodium hydroxide, ammonium hydroxide, water, phosphoric acid and/or diluted sulphuric acid; and
   h) calcining the hydrated titanium dioxide to drive off any residual acid and water of crystallisation to produce titanium dioxide.

2. A method according to claim 1, wherein the titanium dioxide bearing material in step a) is ground to form a particulate material in which at least 80% of particles are able to pass through a 45 micron mesh.

3. A method according to claim 1, wherein cold air is blown through the cake material after the reaction in step b) is completed to produce a porous cake.

4. A method according to claim 3, wherein the cold air is blown through the cake material for about 4 hours.

5. A method according to claim 3, wherein the porous cake is matured.

6. A method according to claim 5, wherein the porous cake matured for about 8 hours.

7. A method according to claim 1, wherein the air is cold enough to control the reaction temperature in order to prevent premature crystallisation of the titanium dioxide.

8. A method according to claim 7, wherein the reaction temperature is below about 85° C.

9. A method according to claim 8, wherein the reaction temperature is below about 75° C.

10. A method according to claim 1, wherein after the desired amount of water has been introduced, air and mechanical agitation are used to break up the cake.

11. A method according to claim 1, wherein the hydrolysing step e) is carried out in the absence of a prior crystallisation and vacuum concentration step.

12. A method according to claim 1, further comprising the step of purifying the titanium dioxide.

13. A method according to claim 12, wherein the purifying step comprises the steps of:
   i) bricketing or pelletising the titanium dioxide and subjecting it to a chlorination step in order to produce gaseous $TiCl_4$;
   j) condensing the gaseous $TiCl_4$ to produce a crude liquid $TiCl_4$;
   k) distilling the crude liquid $TiCl_4$ to produce a substantially pure $TiCl_4$ liquid; and
   one of l) gasifying the pure $TiCl_4$ liquid to produce gaseous $TiCl_4$ and oxidising the gaseous $TiCl_4$ to produce titanium dioxide pigment, or m) treating the pure $TiCl_4$ liquid in a conventional process to produce metallic titanium.

14. A method of recovering titanium dioxide from a titanium dioxide-bearing material containing 22-32% by weight titanium dioxide, comprising the steps of:
   a) providing the titanium dioxide bearing material containing 22-32% by weight titanium dioxide in a particulate form including particles and an up to 96% sulphuric acid solution, in a fusion reactor;
   b) introducing a non-aqueous reaction initiator including a gas consisting of pre-heated air into the fusion reactor to initiate a reaction between the particles of titanium dioxide bearing material and the sulphuric acid solution to form a cake material including titanyl sulphate;
   c) dissolving the cake material by contacting the cake material with a sufficient quantity of water, and by introducing air with the water, in order to facilitate agitation to dissolve the cake, to form a titanyl sulphate-containing solution;
   d) filtering and collecting the titanyl sulphate-containing solution;
   e) hydrolysing the titanyl sulphate-containing solution, and boiling the solution to cause precipitation of hydrated titanium dioxide;
   f) washing the hydrated titanium dioxide to remove residual sulphate;
   g) filtering the hydrated titanium dioxide; and
   h) calcining the hydrated titanium dioxide to produce titanium dioxide.

15. The method of claim 14, wherein at least 80% of the particles of titanium bearing material are able to pass through a 175 micron mesh.

16. The method of claim 14, wherein the reaction in step b) occurs at an elevated temperature.

17. The method of claim 14, further comprising the step of blowing cold air through the cake material to produce a porous cake.

18. The method of claim 17, further comprising the step of maturing the porous cake.

19. The method of claim 14, further comprising the step of mechanically agitating the aqueous solution in step c).

20. The method of claim 14, wherein the reaction in step b) occurs at a temperature below about 85° C.

21. The method of claim 20, wherein the reaction occurs at a temperature below about 75° C.

22. The method of claim 14, further comprising the step of purifying the titanium dioxide.

23. A method of recovering titanium dioxide from a titanium dioxide-bearing material containing 22-32% by weight titanium dioxide, comprising the steps of:
   a) providing the titanium dioxide bearing material containing 22-32% by weight titanium dioxide in a form of particles, at least 80% of which are able to pass through a 175 micron mesh, and an up to 96% sulphuric acid solution in a fusion reactor;

b) introducing a non-aqueous reaction initiator including a gas consisting of pre-heated air into the fusion reactor to initiate a reaction between the particles of titanium dioxide bearing material and the sulphuric acid solution to produce a cake material including titanyl sulphate;

c) dissolving the cake material by contacting the cake material with a sufficient quantity of water, and by introducing air with the water, in order to facilitate agitation to dissolve the cake, to form a titanyl sulphate-containing solution;

d) filtering and collecting the titanyl sulphate-containing solution;

e) hydrolysing the titanyl sulphate-containing solution, and boiling the solution to cause precipitation of hydrated titanium dioxide;

f) washing the hydrated titanium dioxide;

g) filtering the hydrated titanium dioxide;

h) calcining the hydrated titanium dioxide to produce titanium dioxide; and i) purifying the hydrated titanium dioxide.

* * * * *